(12) United States Patent
Tiessen et al.

(10) Patent No.: US 11,707,945 B2
(45) Date of Patent: Jul. 25, 2023

(54) METHOD OF IMPROVING ACTINIC CURE OF COATINGS

(71) Applicant: SUN CHEMICAL CORPORATION, Parsippany, NJ (US)

(72) Inventors: John G. Tiessen, Elk Grove Village, IL (US); Juanita M. Parris, Montvale, NJ (US); Russell Schwartz, Cincinnati, OH (US)

(73) Assignee: SUN CHEMICAL CORPORATION, Parsippany, NJ (US)

( * ) Notice: Subject to any disclaimer, the term of this patent is extended or adjusted under 35 U.S.C. 154(b) by 0 days.

(21) Appl. No.: 16/991,675

(22) Filed: Aug. 12, 2020

(65) Prior Publication Data

US 2020/0369065 A1 Nov. 26, 2020

Related U.S. Application Data

(63) Continuation of application No. PCT/US2019/017580, filed on Feb. 12, 2019.

(60) Provisional application No. 62/629,927, filed on Feb. 13, 2018.

(51) Int. Cl.
| | |
|---|---|
| *C09D 11/54* | (2014.01) |
| *B41M 1/04* | (2006.01) |
| *B41M 1/12* | (2006.01) |
| *B41M 1/06* | (2006.01) |
| *B41M 7/00* | (2006.01) |
| *B41M 5/00* | (2006.01) |
| *B41M 3/00* | (2006.01) |

(52) U.S. Cl.
CPC ........ *B41M 7/0081* (2013.01); *B41M 5/0023* (2013.01); *B41M 7/009* (2013.01); *C09D 11/54* (2013.01); *B41M 1/04* (2013.01); *B41M 1/06* (2013.01); *B41M 1/12* (2013.01); *B41M 3/008* (2013.01)

(58) Field of Classification Search
None
See application file for complete search history.

(56) References Cited

U.S. PATENT DOCUMENTS

| | | | |
|---|---|---|---|
| 2009/0214790 | A1 | 8/2009 | Simpson et al. |
| 2016/0061455 | A1 | 4/2016 | Zhang et al. |
| 2016/0271970 | A1 | 9/2016 | Illsley et al. |
| 2017/0305179 | A1* | 10/2017 | Zhang ............. B41M 1/18 |

FOREIGN PATENT DOCUMENTS

EP 2356184 6/2021

OTHER PUBLICATIONS

European extended Search Report dated Oct. 5, 2022 for Application No. 22176194.3, 5 pages.
International Search Report and Written Opinion dated Aug. 16, 2019 for PCT/US2019/017580, 12 pages.

* cited by examiner

*Primary Examiner* — Joshua D Zimmerman
(74) *Attorney, Agent, or Firm* — Frost Brown Todd LLP

(57) ABSTRACT

A method for printing on a substrate comprises two steps. The first step consists essentially of: applying onto a substrate one or more layers of an energy curable ink and applying one or more layers of a water-based coating over the top of the one or more layers of energy curable ink. The second step comprises the steps of, in any order: a) drying the one or more layers of water-based coating, and b) actinically or electron beam curing simultaneously all the energy curable ink layers.

18 Claims, No Drawings

METHOD OF IMPROVING ACTINIC CURE OF COATINGS

CROSS REFERENCE TO RELATED APPLICATIONS

The present application hereby claims the benefit of PCT/US2019/07580, of the same title, filed on Feb. 12, 2019, which claimed the benefit of the provisional patent application of the same title, Ser. No. 62/629,927, filed on Feb. 13, 2018, the disclosure of which is herein incorporated by reference in its entirety.

BACKGROUND

Oxygen inhibition is an age-old problem for coatings that cure via free-radical polymerization. Molecular oxygen can physically quench the triplet state of the photoinitiator/sensitizer, or it can scavenge the free radicals or active radical centers to produce unreactive peroxide radicals. The end results range from compromised coating properties to uncured, liquid surfaces on the coating. Oxygen (02) can react with a photon-excited photoinitiator molecule by converting it back to the unexcited state, or once a free radical has formed it can also react directly with the free radical to form a peroxide radical which is much weaker at propagating polymerization than the free radical.

BRIEF SUMMARY

A method for printing on a substrate comprises two steps. The first step consists essentially of: applying onto a substrate one or more layers of an energy curable ink and applying one or more layers of a water-based coating over the top of the one or more layers of energy curable ink. The second step comprises the steps of, in any order: a) drying the one or more layers of water-based coating, and b) actinically or electron beam curing simultaneously all the energy curable ink layers.

DETAILED DESCRIPTION

A method for printing on a substrate comprises two steps. The step consists essentially of applying onto a substrate one or more layers of an energy curable ink and applying one or more layers of a water-based coating over the top of the one or more layers of energy curable ink. The second step comprises the steps of, in any order, drying the one or more layers of water-based coating, and actinically or electron beam curing simultaneously all the energy curable ink layers.

The inks and coatings can be applied via virtually any printing method, such as lithography, flexography, letterpress, or gravure.

The method uses energy curable inks, which may contain reduced levels of photoinitiators that when wet trapped (overcoated with a water-based coating) and then cured, provide a printed article that has properties equal to or better than traditional energy curable inks with high levels of photoinitiators. This reduction in photoinitiators is of great value in reducing the need for interstation curing as well as reducing the amount of photoinitiator, which cause issues in migration in sensitive packaging. The method also provides improvements in hardness, scratch/rub resistance, and solvent resistance. In some embodiments, the method includes energy curable inks containing similar levels of photoinitiator to traditional UV-curable inks, but exhibit improved performance when compared to an energy cured inks containing the equivalent amount of photoinitiator but not processed according to the method.

In some embodiments, a pre-printing step is carried out before the method for printing is performed. The substrate is pre-printed with one or more layers of an ink or coating. The ink or coating is then fully dried or cured. This printed or coated substrate becomes the substrate for the printing method described above, i.e., this substrate is printed upon by the two-step method described above.

The pre-printing ink or coating may be one or more layers of a coating of any type, such as solvent-based, water-based, energy curable, hybrid, or combinations thereof.

The energy curable ink contain reactive groups which react with each other after exposure to energy-rich radiation. The ink may be cured using an electron beam (EB) or cured using ultraviolet light (UV). The ink can be UV-cured by an actinic light source, such as UV-light, provided by a high-voltage mercury bulb, a medium-voltage mercury bulb, a xenon bulb, a carbon arc lamp, a metal halide bulb, a UV-LED lamp, a UV laser, such as a semiconductor laser or an excimer laser, or sunlight.

In some embodiments, the water-based coating on the top of the energy curable ink may be dried before or after the energy curable ink is cured. In some embodiments, the water-based coating is removed, such as by blowing it off, after the energy curable ink under the water has been cured. In some embodiments, the water-based coating is blown off with an air knife or similar device.

Substrate

In some embodiments, the substrate is a porous substrate, such as, but not limited to, paper or paperboard that is non-woven or woven in the form of a flat sheet or web. In some embodiments, the paper is clay coated cartonboards such as, SBS, poly-coated papers, and high grade supercalendered printing stock. The porosity of the porous substrate may be measured using the high-pressure Gurley test, 10 cc of air, 1.0 sq. inch orifice. In some embodiments, the porous substrate has a Gurley test of equal or greater than 130 second.

In some embodiments, the porous substrate may be wetted to temporarily reduce porosity. The wetting liquid may be water or another solvent. In some embodiments, the wetting may be on the back side of the porous substrate. The wetting may be by litho press printing, flexo/gravure press printing or other printing method. In some embodiments, the porous substrate is sealed prior to printing, such as by a primer.

In some embodiments, the substrate is a non-porous substrate, such as, but not limited to, polymer film or a metal foil in the form of a flat sheet or web. Examples include, various plastics, glass, metals, and/or coated papers. These may include, but are not limited to, molded plastic parts as well a flat sheets or rolls of polymer films. Common types of polymer films include, but are not limited to, films used in packaging applications. Examples of films used in packaging applications include, but are not limited to, polyester (PET), polypropylene (PP), polyethylene (PE), polylactic acid (PLA), and/or polystyrene (PS). In some embodiments, polyethylene based films are mono-layer films or multi-layer films up to about nine layers including barrier polymer layers. Films may have coatings or skin layers to provide various functional and appearance properties. These include, but are not limited to, metalization, barrier coatings, heat sealing layers, and/or print receptive primers. Films may also contain pigments, fillers, and/or air voids to add color and/or opacity. Films may include heat shrink films used to produce shrink labels including sleeve labels. Metal substrates include, but are not limited to, aluminum foil. Multilayer laminated substrates may also be used. Examples of multi-layer laminated substrates may include, but are not limited to, PET/PE, PET/AI foil/PE, PE/paper, and/or paper/PE/AI foil/PE. The printed plastic film, paper or paperboard may subsequently be laminated to a second or more plastic film, to form a printed laminate film.

In some embodiments, the substrates are used in the production of printed packaging. The different types of packaging include flexible packaging, labels, folding cartons, rigid plastic containers, glass containers, and/or metal cans. Rigid plastic containers include bottles, jars, tubs, and tubes. The printed packaged containers may contain food products, non-food products, pharmaceutical, and/or personal care items.

Ink

The energy curable ink may be printed on sum, most, or all of the substrate.

There are two types of energy curable inks, UV curable inks and electron beam curable inks. Typically, UV curable inks comprise one or more colorant, vehicle, diluent, photoinitiator, and additives. The diluent controls viscosity and tack. It is typically an acrylate oligomer. Typically, electron beam curable inks comprise one or more colorant, vehicle, diluent, and additives.

In some embodiments, the energy curable inks comprise a vehicle portion of the ink formulation. Such vehicle portion may comprise dispersible polymerizable and/or crosslinkable monomers, oligomers, and/or polymers. In order for a monomer, oligomer, or polymer to polymerize or crosslink under actinic exposure it is beneficial if they have reactive functional groups. Reactive functional groups may include, for example, but are not limited to, acrylates, acrylamides, vinyl ethers, allyl ethers, maleates, itaconates, epoxies, and/or oxatanes. In some embodiments, the reactive groups are free radical polymerizable end groups. In some embodiments, the free-radical curable groups are acrylate groups. In some embodiments, there are other functional groups on the acrylate monomers or oligomers, such as, but are not limited to, hydroxyl, carboxyl, amino groups and/or their associated salts. In some embodiments, the vehicle is selected from polyester acrylates, urethan acrylates, epoxy acrylates, and combinations thereof.

Photoinitiator

The energy curable ink comprises about 0% to about 15% photoinitiator by weight that has been printed or coated onto a substrate. The energy curable ink is cured by exposure to UV light at commercially available intensities at typical printing press or coater speeds. In some embodiments, the energy curable ink contains about 0% to about 12% photoinitiator, such as about 0% to about 10%, about 0% to about 8%, about 0% to about 6%, about 0% to about 5%, about 0% to about 4%, about 0% to about 2%, about 0.5% to about 10%, about 0.5% to about 8%, about 0.5% to about 6%, about 0.5% to about 5%, about 0.5% to about 4%, about 0.5% to about 2%, about 0.5% to about 1%. In some embodiments, the energy curable ink is an actinic curable ink (curable by actinic radiation). In some embodiments, the energy curable ink is an electron beam curable ink (curable by electron beam radiation).

In some embodiments, the energy curable ink is curable by electron beam and is free from photoinitiator.

Examples of photoinitiators, include, but are not limited to benzophenones, benzilketales, dialkoxy acetophenones, hydroxyalkyl-acetophenones, aminoalkylphenones, acylphosphinoxides and thioxanthones, for example benzophenone, methylbenzophenone, 4-phenylbenzophenone, 4,4'-bis(dimethylamino)-benzophenone, 4,4'-bis(diethylamino)-benzophenone, 2,2-dimethoxy-2-phenylacetophenone, dimethoxyacetophenone, diethoxy-acetophenone, 2-hydroxy-2-methyl-1-phenylpropan-1-one, 2-benzyl-2-dimethylamino-1-(4-morpholinophenyl)-butan-1-one, 2-methyl-1-[4(methoxythio)-phenyl]-2-morpholinopropan-2-one, diphenylacylphenyl phosphinoxide, diphenyl(2,4,6-trimethylbenzoyl) phosphinoxide, 2,4,6-trimethylbenzoylethoxyphenyl phosphinoxide, 2-isopropylthioxanthone, 4-isopropylthioxanthone, 2,4-dimethylthioxanthone or mixtures thereof.

In some embodiments, the photoinitiator is selected from Type I: 2-benzyl-2-dimethylamino-1-(4-morpholinophenyl)-butan-1-one, bis-acyl phosphine oxide (Irgacure 819), 2,4,6-Trimethylbenzoyldiphenylphosphine, ethyl phenyl (2,4,6-trimethylbenzoyl) phosphinate, 50/50 blend of Darocur 1173 and 2,4,6-Trimethylbenzoyldiphenylphosphine, 2-methyl-1-[4(methoxythio)-phenyl]-2-morpholinopropan-2-one; Type 2: isopropylthioxanthone, 2,4-Diethylthioxanthone, 2-ethylhexyl-4-dimethylaminobenzoate, ethyl Micheler's ketone, and polymeric Type IIs; and combinations thereof.

In some embodiments, the photoinitiator is selected from 2-benzyl-2-dimethylamino-1-(4-morpholinophenyl)-butan-1-one, bis-acyl phosphine oxide (Irgacure 819), 2,4,6-Trimethylbenzoyldiphenylphosphine, ethyl phenyl (2,4,6-trimethylbenzoyl) phosphinate, 50/50 blend of Darocur 1173 and 2,4,6-Trimethylbenzoyldiphenylphosphine, 2-methyl-1-[4(methoxythio)-phenyl]-2-morpholinopropan-2-one, and combinations thereof.

In some embodiments, the photoinitiator is selected from bis-acyl phosphine oxide (Irgacure 819), 2,4,6-Trimethylbenzoyldiphenylphosphine, ethyl phenyl (2,4,6-trimethylbenzoyl) phosphinate, Irgacure 754; 211510-16-6; benzeneacetic acid, a-oxo-,1,1'-(oxydi-2,1-ethanediyl) ester, and methyl benzoyl formate, and combinations thereof.

In some embodiments, the photoinitiator is selected from bis-acyl phosphine oxide (Irgacure 819), 2,4,6-Trimethylbenzoyldiphenylphosphine, ethyl phenyl (2,4,6-trimethylbenzoyl) phosphinate, and combinations thereof.

An ink designed for food packaging requires lower amounts of low molecular weight monomeric photoinitiators because they can migrate from the ink to the food. In some embodiments, there are not low molecular weight monomeric photoinitiators. Instead there are oligomeric or polymeric photoinitiators. In some embodiments, oligomeric or polymeric photoinitiators include, but are not limited to, photoinitiators containing oligomeric benzophenone derivatives such as Omnipol BP from IGM resins, oligomeric amines such as Genopol AB-1 from Rahn Group, and oligomeric type-I-photo initiators such as Omnipol 910 from IGM company.

Colorants

In some embodiments, colorants in the form of pigments and/or dyes may be combined with energy curable vehicles above to produce inks. Pigments may be in a dry powder form, which can then milled along with a portion of the vehicle or monomers or resins using technology which is well known in the art. Examples of colorants include, but are not limited to, organic pigments, metallic pigments, effect pigments such as pearlescent pigments, and combinations thereof.

The energy curable ink comprises one or more colorants in the form of a dye or pigment. Pigments suitable for use include, but are not limited to, conventional organic or inorganic pigments. Representative pigments include, but are not limited to, the group of Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 111, Pigment Yellow 114, Pigment Yellow 121, Pigment Yellow 126, Pigment Yellow 127, Pigment Yellow 136, Pigment Yellow 138, Pigment Yellow 139, Pigment Yellow 174, Pigment Yellow 176, Pigment Yellow 188, Pigment Yellow 194, Pigment Orange 5, Pigment Orange 13, Pigment Orange 16, Pigment Orange 34, Pigment Orange 36, Pigment Orange 61, Pigment Orange 62, Pigment Orange 64, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 48: 2, Pigment Red 53: 1, Pigment Red 57: 1, Pigment Red 81: 1, Pigment Red 112, Pigment Red 122, Pigment Red 170, Pigment Red 184, Pigment Red 210, Pigment Red 238, Pigment Red 266, Pigment Blue 15, Pigment Blue 15: 1, Pigment Blue 15: 2, Pigment Blue 15: 3, Pigment Blue 15: 4, Pigment Blue 61, Pigment Green 7, Pigment Green 36, Pigment Violet 1, Pigment Violet 19, Pigment Violet 23, Pigment Black 7, and combinations thereof.

Inert Hard Resin

An inert hard resin is a natural or synthetic, amorphous material, which forms a tack-free film at room temperature after application to a substrate. Most of these materials are not acrylated and not capable of crosslinking by energy cure.

In some embodiments, the energy curable ink comprises an inert hard resin that is compatible and/or soluble with the acrylate monomers and oligomers, oils and alkyd resins used in the energy curable ink. Examples of inert hard resins include, but are not limited to, rosin resin derivatives, which consist of a variety of isomers and different chemical structures, such as derivatives of abietic acid, levopimaric acid, neoabietic acid, palustric acid, dehydroabietic acid, pimaric acid and isopimaric acid. The rosin derivative can be modified with maleic anhydride or fumaric acid and esterified with polyols such as glycerol and pentaerythritol, or a phenolic rosin resin.

In some embodiments, the energy curable ink comprises a maleic rosin resin which is soluble in acrylic monomers. Examples of a maleic rosin resin include, but are not limited to, Jonrez IM 816, Jonrez IM 817, Jonrez IM 824, Jonrez IM 833 (all from Westvaco), Arez RE 3010 (AREZ International), Resinall's 440 and 445, Filtrez 3300 (AKZO). In some embodiments, the resin has a softening point >100° C., a cloud point >100° C. in 10% 6/9 mineral test oil from Halterman Company and an acid value of 10-40 mg KOH/g.

In some embodiments, the energy curable ink comprises an acrylate soluble hydrocarbon resins or modified hydrocarbon resins. Examples of acrylate soluble hydrocarbon resins or modified hydrocarbon resins include, but are not limited to aromatic C-9 hydrocarbon resins having a softening point of >100° C. such as Norsolene S125, S135, S145 (all from Cray Valley) or GA-120, a C9 aromatic hydrocarbon resin (Luen Liang Industrial, Taiwan) and mixtures thereof.

In some embodiments, the energy curable ink comprises an oil-modified phenolic resin, a ketone resin, an aldehyde-urea resin, an oil modified polyester resin, a melamine resin, an epoxy resin, a polyurethane resin, an acrylic styrene resin, or mixtures thereof, provided that the resin is soluble in any acrylic monomers, oligomers, oils, and alkyds used in the ink.

Monomers or Oligomers

The energy curable inks comprise polymerizable monomers or oligomers. The monomers or oligomers may be selected from acrylate monomers or acrylate oligomers. In some embodiments, the monomers are selected from acrylate, capralactone, and pyrrolidone monomers.

Acrylate monomers suitable for the energy curable inks comprise acrylic monomers having 1-6 acrylic groups. Examples of acrylate monomers include, but are not limited to, 1,2-ethylene glycol diacrylate, 1,4-butandiol diacrylate, 1,6-hexandiol diacrylate, dipropylene glycol diacrylate, neopentylglycol diacrylate, ethoxylated neopentylglycol diacrylates, propoxylated neopentylglycol diacrylates, tripropylene glycol diacrylate, bisphenol-A diacrylate, ethoxylated bisphenol-A-diacrylates, bisphenol-A-diglycidylether diacrylate, poly(ethylene)glycol diacrylates, trimethylolpropane triacrylate, trimethylolpropane trimethacrylate, ethoxylated trimethylolpropane triacrylates, propoxylated trimethylolpropane triacrylates, propoxylated glycerol triacrylates, pentaerythritol triacrylate, ethoxylated pentaerythritol triacrylates, propoxylated pentaerythritol tetraacrylates, ethoxylated pentaerythritol tetraacrylates, ditrimethylolpropane tetraacrylate, dipentaerythritol pentaacrylate, dipentaerythritol hexaacrylate ethoxylated dipentaerythritol hexaacrylates or mixtures thereof.

In some embodiments, the monomers are selected from 1,6-hexandiol diacrylate, 3-methyl 1,5-pentanediol diacrylate, dipropylene glycol diacrylate, propoxylated neopentylglycol diacrylates, tripropylene glycol diacrylate, ethoxylated bisphenol-A-diacrylates, bisphenol-A-diglycidylether diacrylate, poly(ethylene)glycol diacrylates, trimethylolpropane triacrylate, ethoxylated trimethylolpropane triacrylates, propoxylated trimethylolpropane triacrylates, propoxylated glycerol triacrylates, propoxylated pentaerythritol tetraacrylates, ethoxylated pentaerythritol tetraacrylates, ditrimethylolpropane tetraacrylate, and combinations thereof.

In some embodiments, the monomers are selected from tripropylene glycol diacrylate, trimethylolpropane triacrylate, ethoxylated trimethylolpropane triacrylates, propoxylated glycerol triacrylates, and ethoxylated pentaerythritol tetraacrylates, propoxylated pentaerythritol tetraacrylates, and combinations thereof.

In some embodiments, the monomers are selected from 3-methyl 1,5-pentanediol diacrylate, tripropylene glycol diacrylate, trimethylolpropane triacrylate, propoxylated glycerol triacrylates, ethoxylated pentaerythritol tetraacrylates, and combinations thereof.

In some embodiments, the monomers are selected form ethoxylated trimethylolpropane triacrylates, propoxylated pentaerythritol tetraacrylates, and combinations thereof.

Acrylate Oligomers

The energy curable ink optionally comprises one or more acrylated oligomers with a weight number average of about 400-3,000 Daltons. The weight number average is determined using gel permeation chromatography (GPC). It is a relative technique typically using polystyrene as the calibration standard. The molecular weight is then given in terms of the equivalent polystyrene molecular weight. The units are in Daltons. In some embodiments the acrylated oligomers have an acrylate functionality of 2 or more. Examples of acrylated oligomers include, but are not limited to, acrylated oils based on linseed-, soy- and castor oil; epoxy acrylates; oil modified polyester acrylates such as Ebecryl 870 (Allnex); acrylated polyurethanes; acrylated polyacrylates; acrylated polyethers; and acrylated amines. The acrylated oligomers may impart rheology, pigment wetting, transfer, gloss, chemical resistance, and other film properties. In some embodiments the acrylated oligomer is acrylated oil or an oil-modified polyester.

Optional Additives

In order to avoid premature polymerization of the double-bonds in the oils and alkyd resin, an antioxidant may be added. Exemplary anti-oxidants include ascorbic acid, astaxanthin, carotene, chroman (3,4-dihydro-2H-1-benzopyran), hexamethylene bis(3,5-di-tert-butyl-4-hydroxy-hydro-cinnamate), octadecyl 3,5-di-tert-butyl-4-hydroxy-hydro-cinnamate, vitamin E and vitamin E analogs, mono-tert-butylhydroquinone (MTBHQ) and butylated hydroxy toluene (BHT). In some embodiments, the anti-oxidants are selected from MTBHQ, BHT, and combinations thereof.

In some embodiments the energy curable ink further comprise additives to modify flow, surface tension, gloss, pigment wetting, and abrasion resistance of the cured coating or printed ink. Such additives contained in inks or coatings typically are surface-active agents, waxes, shelf-life stabilizers, etc. and combinations thereof. These additives may function as leveling agents, shelf-life stabilizers, wetting agents, slip agents, flow agents, dispersants and de-aerators. Examples of additives include, but are not limited to, fluorocarbon surfactants, silicones and organic polymer surfactants. Examples include the Tegorad product lines (Tegorad are trademarks and are commercially available products of Tego Chemie, Essen, Germany) and the Solsperse product lines (Solsperse are trademarks and are commercially available products of Lubrizol Company).

In some embodiments the energy curable ink further comprise extenders such as clay, talc, calcium carbonate, magnesium carbonate, silica, or combinations thereof, to adjust water pickup, misting, and color strength.

The ink can be made by typical procedures known in the art, usually by dry-grinding or using a flush, color concentrate or base.

In a typical dry-grind manufacturing procedure for inks, the required amount of dry pigment is mixed with conventional oils, alkyd resin, inert hard resins and acrylate in a dissolver or mixer for about 15-30 minutes to wet out all pigment. Typically, the inert hard resin is introduced as a solution in either oil or acrylate monomer (vanish). The pre-mix is then ground on a three roll mill (or other grinding mill) at a pressure of about 1-4 MPa and a temperature of 20-40° C. until the desired grind specifications are met. Photoinitiators can be added before or after grinding in the form of a solution or paste.

In the "flushing process" the wet pigment press cake is "flushed" in high shear grinding equipment like, for example, a sigma blade mixer. Oil, varnish, alkyd, and/or other non-aqueous hydrophobic vehicles are added and the pigment will eventually flush into the organic phase and leave the water phase clear of pigment. A substantial part of the water can then be poured off. In order to remove the remaining water, usually heat and vacuum is applied. The resulting product is called a "flush paste" or pigment concentrate (base). Then, the pigment concentrate is diluted with acrylate monomer, oligomer, optional photoinitiator and solution of inert hard resin (varnish).

Energy curable inks can be cured by an actinic light source, such as for example UV-light, provided by a high-voltage mercury bulb, a medium-voltage mercury bulb, a xenon bulb, a carbon arc lamp, a metal halide bulb, a UV-LED lamp, or sunlight. In some embodiments, the wavelength of the applied irradiation is within a range of about 200 to 500 nm, such as about 250 to 350 nm. In some embodiments, UV energy is within a range of about 30 to 3,000 mJ/cm$^2$, such as a range of about 50 to 500 mJ/cm$^2$. In addition, the bulb can be appropriately selected according to the absorption spectrum of the energy curable composition. Moreover, the inks can be cured under inert conditions or as an ink laminated by a plastic foil.

Energy curable inks may be cured by electron beam radiation (EB). Commercially EB-dryers are available for example from Energy Science, Inc. of Wilmington, Mass., or from Advanced Electron Beams Inc. (AEB) of Wilmington, Mass. The energy absorbed, also known as the dose, is measured in units of kilo-Grays (kGy), one kGy being equal to 1,000 Joules per kilogram. In some embodiments, the electron beam dose is within the range of 10 kGy to about 40 kGy for complete curing, such as a radiation dose of 20-30 kGy at an oxygen level of <200 ppm.

Water-Based Coatings

In some embodiments, the water-based coating is thermally dried by exposure to air flow and/or heat and/or IR radiation prior to or after the energy curable ink beneath it being exposed to actinic radiation or electron beam. In either case, the cure properties (rub and/or solvent and/or scratch resistance) of the finished structures significantly exceed those of the same ink cured without the barrier being present.

The water-based coating may be printed on sum, most, or all of the substrate and/or ink. In some embodiments, the water-based coating is applied by a non-contact method, including, but not limited to curtain coater, slide coater, drop die, spray bar, and ink jet. In some embodiments, the water-based coating is applied by flexo, gravure, or blanket coating.

In some embodiments, the water-based coating is a relatively air impermeable layer.

In some embodiments, the water-based coating contains essentially no acrylates. Essentially no acrylates means that there is less than 5 wt. % acrylates, such as less than 4 wt. %, 3 wt. %, 2 wt. %, 1 wt. %, 0.5 wt. %, 0.1 wt. %, and 0.01 wt. %. In some embodiments, there are no acrylates in the water-based coating.

The water-based coating may comprise additional solvents, such as those typically employed for ink and coating formulations. These include, but are not limited to water, acetates, alcohols, ketones, glycol ethers, esters, aliphatic and aromatic hydrocarbons or other petroleum distillates, or blends thereof. In some embodiments, the coatings are water-based, meaning that the solvent is more than 50% water by weight. There may be additional organic solvents present. In some embodiments, the coatings are water-based, and the binder polymer or polymers are obtained from mono-ethylenically unsaturated monomers, known colloquially as "acrylics." They are usually copolymers of at least two alkyl esters of one or more mono-ethylenically unsaturated carboxylic acids, such as for instance methyl methacrylate/butyl acrylate copolymer, but may also be homopolymers. Any water-compatible or water-soluble acrylic polymer can be employed, such as for example, acrylic polymers and co-polymers, styrene acrylic emulsions, acrylic amide copolymers and co-polymers and/or acrylic colloidal dispersions. In some embodiments the compositions employ an excess of amine for acrylic based compositions to maintain solubility, or alternately may utilize starches or their derivatives as revealed in EP2356184B1, which is hereby incorporated by reference.

In some embodiments, acrylic and polyurethane dispersions are alkaline and stabilized such that the particles do not agglomerate and/or settle out of the water. This can be done, for example, by neutralizing dispersed polymer acid moieties, such as pendant carboxylic acid moieties, with a basic compound such as ammonia or an amine. Useful amines include aliphatic, cycloaliphatic, aromatic, or heterocyclic amines having one or more primary, secondary or tertiary amino groups that are water soluble. Especially preferred are alkoxyamines. Examples include but are not limited to ammonia (aq.), ethanolamine(mono, di, tri), propanolamine, isopropanolamine, urea, 2-(dimethylamino)ethanol, 2-amino-2-methyl-1-propanol and similar materials.

Resins used in water-based coatings may include the aforementioned acrylic and polyurethane resins. As used herein, a "water-based acrylic" (or "water-based polyurethane") is an acrylic (or polyurethane) that is water soluble or dispersible, and compatible with a waterborne ink or coating composition. Other resins can also be present such as polyesters, styrene-maleic anhydride resins and half esters, styrene-butadiene latexes, polyvinylalcohols, SBR latexes, vinyl acetate emulsions and other water compatible polymers. The resins can vary in molecular weight and can include surface tension modifiers.

In some embodiments, the water-based coating consists essentially of water.

In some embodiments, the water-based coatings comprise surface active agents and low molecular weight oligomers.

In some embodiments, optional additives impart various properties to the water-based coating compositions, such as, but not limited to, surface tension modifiers, defoamers, preservatives, biocides, dispersants, thickeners, and cross-linking agents. In some embodiments, plasticizers and/or coalescing agents are used to modify the properties of the resins as well as to aid in film-forming during the drying process. Adjustment of surface characteristics of the dried coating can be made with waxes such as, but not limited to, amide wax, erucamide wax, polypropylene wax, paraffin wax, polyethylene wax, teflon, carnuba wax, and the like or their combinations. Wax, if present, is typically in an amount of up to about 4 wt. %. Any of the known additives typically employed in inks and coatings can be used in the formulation of the relevant water-based coatings.

In some embodiments, additives are in the formulations of the inks, coatings, or both. Additives include, but are not limited to, dispersing agents, surfactants, flow modifiers, plasticizers, buffers, lubricants and stabilizers.

Where an ink is to be used on food packaging, it is essential, from the point of view of customer acceptance, that it should not contaminate the food or impart any unnatural odor to it. Moreover, there is an increasing tendency for legislation to prescribe very low levels of contaminants in foods and other matter which could affect public health. Contamination, in this context, can result from migration of components of an ink into the foodstuff or other packaged material or from undesirable odors imparted to the packaged material by the ink. The reduction of photoinitiator also reduces the likelihood that the photoinitiator migrates. In addition, improved cure reduced the likelihood that unreacted monomer migrates.

Migration testing is often used to determine the potential for ink components to enter the package and adulterate the packaged product. Migration testing methods often involve the use food simulants to mimic migration into food products. Electron beam curable inks may give low migration upon curing. In some embodiments, migration levels of ink components may be below about 100 ppb, below about 90 ppb, below about 80 ppb, below about 70 ppb, below about 50 ppb, and/or below about 10 ppb. In some embodiments, migration levels of ink components into the food simulants is below about 50 ppb, such as less than about 10 ppb, which may allow compliance with food and pharmaceutical packaging regulations in many regions of the world including FDA regulations in the US.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art. Furthermore, features from separate lists can be combined; and features from the examples can be generalized to the whole disclosure.

EXAMPLES

Example 1: Improved Cure of UV Ink with Overcoat at Equivalent Photoinitiator Level Sun Chemical Corporation's commercial UV curable ink, SunCure (SC) Edge Pro Yellow, FLZSV2444209 (containing 5-10% photoinitiator), was applied with Little Joe Proof Press with 0.4 mil (10 micron) wedge plate onto BYK Chart 2810 coated paper. The ink was not cured. Sun Chemical Corporation's commercial water-based coating Vallocoat™ 1349 High Gloss; 841349 was applied over the top of the ink using a bladed Harper Phantom hand-proofer with a 360 lpi/4.23 bcm anilox cylinder and an approximate dry coating weight of 1.03 g/m$^2$. The approximate wet coating weight was 2.68 g/m$^2$. In the case of water as a coating (preferably deionized water—DI), tape was placed around the edges of the print to build a barrier so that the water would pool on the print to entirely cover the ink. The water-based coating was then dried using a hot air blow dryer for 5-8 seconds. UV cure was then achieved using a mercury vapor lamp set at 50% power (80 W/cm) and 120 fpm (36.6 m/min). The resulting print had a color density of 0.99 and 60 degree gloss of 42.7. Cure was determined using a cotton ball soaked in methyl ethyl ketone (MEK) and the number of strokes until ink transferred onto the cotton ball recorded. Higher numbers are an indication of better cure. Results are summarized below.

Example 1 Results

|  | Comparative | Comparative with WB Coating | Inventive Example A | Inventive Example B | Inventive Example C |
|---|---|---|---|---|---|
| Step #1 | Print Ink | Print Ink | Print Ink | Print Ink | Print Ink |
| Step #2 | UV Cure | UV Cure | Apply WB Coating | Apply WB Coating | Apply DI Water |
| Step #3 | — | Apply WB Coating | UV Cure | Heat Dry | UV Cure |
| Step #4 | — | Heat Dry | Heat Dry | UV Cure | Blow Off Water and Heat Dry |

-continued

|  | Comparative | Comparative with WB Coating | Inventive Example A | Inventive Example B | Inventive Example C |
|---|---|---|---|---|---|
| MEK Rubs to Failure | 3 | 5 | 158 | 190 | 23 |

In Inventive Example A the undried coating over uncured ink that is UV cured then dried has dramatically improved cure. MEK rubs to failure is 158 versus cured ink alone or inks that is cured and then overcoated with a water-based coating. In Inventive Example B drying the coating over uncured ink prior to exposure to UV dramatically improves cure still further. MEK rubs to failure is 190 versus cured ink alone or inks that is cured and then overcoated with a water-based coating. In Inventive Example C water alone over uncured ink that is UV cured then dried has dramatically improved cure. MEK rubs to failure is 23 versus cured ink alone or inks cured and then overcoated with a water-based coating.

Example 2: Improved Cure as a Function of Coat Weight

SC Edge Pro Yellow, FLZSV2444209, was applied with Little Joe Proof Press with 0.4 mil (10 micron) wedge plate onto BYK Chart 2810 coated paper. The ink was not cured. Sun Chemical Corporation's commercial water-based coating Vallocoat™ 1349 High Gloss; 841349 was applied over the top of the ink using a bladed Harper Phantom hand-proofer with a 360 lpi/4.23 bcm, 600 lpi/2.5 bcm and 800 lpi/1.7 bcm anilox cylinder. The water-based boating was then dried using a hot air blow dryer for 5-8 seconds. UV cure was then achieved using a mercury vapor lamp set at 50% power (80 W/cm) and 120 fpm (36.6 m/min). Cure was determined using a cotton ball soaked in MEK and the number of strokes until ink transferred to the cotton ball recorded. Higher numbers are an indication of better cure. Results are summarized below.

Example 2 Results

|  | Inventive Example B (from above) | Inventive Example D | Inventive Example E |
|---|---|---|---|
| Anilox (bcm) | 4.23 | 2.5 | 1.7 |
| Anilox (lpi) | 360 | 600 | 800 |
| Water-Based Coating Weight |  |  |  |
| Dry (g/m$^2$) | 1.03 | 0.58 | 0.38 |
| Density | 1.049 | 1.052 | 0.945 |
| MEK Rubs to Failure | 190 | 157 | 135 |

In Inventive examples D and E the undried coating over uncured ink is processed in the same manner as Inventive Example B—(Print Ink, Apply WB Coating, Heat Dry, UV Cure—see Example 1 above). In these examples the coating weight of water-based coating is reduced to determine the relationship of coating weight to MEK resistance. It should be noted that 1.0 g/m$^2$ (dry) for a water-based coating is already a relatively thin coating from a commercial perspective. Typical coating weights for water-based coatings in commercial usage are typically twice that or more. We see in Inventive Example D that reducing the coating weight to 56% that of Inventive Example B only reduces the MEK rub resistance to 83% of the former level. Likewise for Inventive Example E a reduction in coating weight to 37% of the weight used in Inventive Example B only reduces the MEK rub resistance to 71% of the previous level. In both cases the rub resistance far exceeds that of the conventionally printed/cured UV ink (without the water-based barrier), and also vastly exceeds the value of the conventionally printed/cured UV ink overcoated with water-based coating that is cured prior to applying the water-based coating ("Comparative" and "Comparative with WB Coating" described in Example 1 above). This shows that only a low film weight of water-based coating is needed to obtain improved cured ink films.

Example 3: UV Ink with Reduced Photoinitiator

A yellow blending ink was mixed/milled to a fineness of grind of 2/0 (NPIRI) and color matched to the same color strength as FLZSV2444209. This yellow blending ink does NOT contain photoinitiator ("Yellow Blending Ink—PHOTOINITIATOR FREE" formula below). The photoinitiated FLZSV2444209 and photoinitiator-free inks were blended together in various quantities with simple mixing to achieve varying levels of photoinitiator in the final ink. The ink was applied with Little Joe Proof Press with 0.4 mil (10 micron) wedge plate onto BYK Chart 2810 coated paper. The ink was not cured. Sun Chemical Corporation's commercial water-based coating Vallocoat™ 1349 High Gloss; 841349 was then applied over Examples F-J inks (but not the Comparative Control FLZSV2444209) using a bladed Harper Phantom hand-proofer with a 360 lpi/4.23 bcm anilox cylinder. For comparative purposes, the Comparative Control FLZSV2444209 was applied to the substrate and cured without any water-based coating applied over the top. For example F-J, the water-based coating was dried using a hot air blow dryer for 5-8 seconds. UV cure was then achieved using a mercury vapor lamp set at 50% power (80 W/cm) and 120 fpm (36.6 m/min). Cure was determined using a cotton ball soaked in MEK by recording the number of strokes until ink transferred. Higher numbers are an indication of more cure. Results are summarized below. Example B is the same as is shown in Example 1 above.

Yellow Blending Ink—Photoinitiator Free

| COMPONENT | Wt. % |
|---|---|
| Flint Group, Yellow Pigment 174DT1363 | 11.16% |
| Ebecryl 870 | 49.81% |
| Trimethylolpropane triacrylate monomer | 13.00% |
| Propoxylated neopentylglycol diacrylate Monomer | 10.74% |
| Dow Chemical DM55 acrylic resin | 6.68% |
| Ebecryl 812 | 4.46% |
| Ebecryl 450 | 1.86% |
| Solsperse 32000 | 1.49% |

-continued

| COMPONENT | Wt. % |
|---|---|
| Rahn Stabilizer 12-191 | 0.74% |
| Eastman Stabilizer 4-methoxy phenol | 0.06% |
| Total | 100.00% |

Example 3 Blend Formulas

| Example | % FLZSV2444209 | % PI-Free Yellow Blending Ink | % PI Reduction | MEK Rubs to Failure |
|---|---|---|---|---|
| Comparative Control FLZSV2444209 (w/o WB coating) | 100 | 0 | 0 | 5 |
| Yellow Blending Ink (PI Free) | 0 | 100 | PI-free | 0.5 |
| Inventive Example F | 10 | 90 | 90 | 9 |
| Inventive Example G | 20 | 80 | 80 | 23 |
| Inventive Example H | 30 | 70 | 70 | 45 |
| Inventive Example I | 40 | 60 | 60 | 117 |
| Inventive Example J | 50 | 50 | 50 | 177 |
| Inventive Example B FLZSV2444209 (with WB coating) | 100 | 0 | 0 | 190 |

Inventive examples F-J show that the amount of photoinitiator needed to cure the ink can be greatly reduced when a water-based coating is applied over the uncured UV ink prior to UV exposure. Alternately, the amount of photoinitiator can be held constant to achieve a dramatic increase in cure (compare Inventive Example B to Comparative Control). Though increased amounts of photoinitiator can lead to improved cure (as is shown in the table above), it would be possible to use smaller amounts of photoinitiator and still show greatly improved and commercially acceptable cure vs. an ink that contains higher amounts of photoinitiator but does not have the water-based barrier layer. Reduction in photoinitiator is especially desirable in applications where low migration is advantageous (e.g. food contact coatings).

Example 4: Increased Oxygen in EB Cured Ink with Water Based Coating

Sun Chemical Corporation's commercial electron beam (EB) curable ink, SunBeam Advance Pro Rubine, FLZWB4444369, was applied with Little Joe Proof Press with 0.4 mil (10 micron) wedge plate onto BYK Chart 2810 coated paper. The ink was not cured. Sun Chemical Corporation's commercial water-based coating Vallowet F WR HR OPV (SYSWW1496-91532510) was applied over the top of the ink (bottom half) using a bladed Harper Phantom hand-proofer with a 360 lpi/4.23 bcm anilox cylinder. The coating was not dried. The printed image was exposed to electron beam irradiation generated in an electron beam curing unit manufactured by Comet Inc. at 30 Mrads dose, 125 kV penetration voltage and standard (30-40 ppm) oxygen and higher (450 and 1000 ppm) oxygen. Cure was determined in the ink only and ink plus coating using a cotton ball soaked in isopropyl alcohol (IPA) and the number of strokes until ink transferred onto the cotton ball recorded. Higher numbers are an indication of better cure. Results are summarized below.

Example 4: EB Ink with Increased Oxygen

| | Control | Inventive Example K |
|---|---|---|
| Ink | SunBeam Advance Pro Rubine | SunBeam Advance Pro Rubine |
| Coating | None | Vallowet F WR HR OPV |

-continued

| | Control | Inventive Example K |
|---|---|---|
| Oxygen (ppm) | | |
| 70 | 11.5 | 19 |
| 450 | 5 | 17 |
| 210,000 (atmospheric) | 1 | 2 |

This example shows that at several different oxygen concentrations, the inventive method provides an improvement to the cure of the ink because of its ability to withstand IPA strokes.

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. A method for printing on a substrate comprising consisting of a first step and a second step, wherein;
   the first step consists of:
   (a) applying onto a substrate one or more layers of an energy curable ink, and
   (b) applying one or more layers of a water-based coating over the top of the one or more layers of energy curable ink;
   the second step consists of:
   (a) actinically or electron beam curing simultaneously all the energy curable ink layers, and
   (b) drying or removing the one or more layers of water-based coating,
   wherein the substrate is first printed with one or more layers of an ink or coating which are all fully dried or cured prior to the first step.

2. The method of claim 1, wherein the second step comprises in order, the steps of:
   (c) actinically or electron beam curing simultaneously all the energy curable ink layers, and
   (d) drying the one or more layers of water-based coating.

3. The method of claim 1, wherein the one or more energy curable ink layers are applied by digital, flexo, offset, or screenprinting processes, or a combination thereof.

4. The method of claim 1, wherein the one or more water-based coatings are applied by flexo, rod, gravure, spray, or offset processes, or a combination thereof.

5. The method of claim 1, wherein the substrate is a porous substrate selected from paper or paperboard that is non-woven or woven in the form of a flat sheet or web.

6. The method of claim 1, wherein the substrate is a non-porous substrate selected from a polymer film or a metal foil in the form of a flat sheet or web.

7. The method of claim 1, wherein the one or more energy curable ink layers comprise electron beam curable inks.

8. The method of claim 1, wherein the one or more energy curable ink layers comprise actinic curable inks which contain up to 15% or one or more photoinitiators.

9. The method of claim 1, wherein actinic curing is selected from UV cure, UV laser, UV LED, sunlight, and combinations thereof.

10. The method of claim 1, wherein the source of the actinic radiation is selected from high-voltage mercury bulb, a medium-voltage mercury bulb, a xenon bulb, a carbon arc lamp, a metal halide bulb, a UV-LED lamp, a UV laser, and combinations thereof.

11. The method of claim 1, wherein electron beam curing is done with radiation exposure at a dose of from about 10 kGy to about 40 kGy.

12. The method of claim 1, wherein the water-based coating consists essentially of water.

13. The method of claim 1, wherein the water-based coating contains essentially no acrylates.

14. A printed article produced using the method of claim 1.

15. The article of claim 14 wherein the article is a packaging article.

16. The article of claim 14 wherein the article is an electronic article or component.

17. A method for printing on a substrate consisting of:
   a. a first step consisting of in order:
      (1) applying onto a substrate one or more layers of an energy curable ink, and
      (2) applying one or more layers of a water-based coating over the top of the one or more layers of energy curable ink; and
   b. a second step consisting of in order:
      (1) actinically or electron beam curing simultaneously all the energy curable ink layers, and
      (2) drying or removing the one or more layers of water-based coating.

18. A method for printing on a substrate consisting of in order:
   a. a first step consisting essentially of:
      (1) applying onto a substrate one or more layers of an energy curable ink, and
      (2) applying one or more layers of a water-based coating over the top of the one or more layers of energy curable ink;
   b. a second step consisting essentially of:
      (1) actinically or electron beam curing simultaneously all the energy curable ink layers, and
      (2) drying or removing the one or more layers of water-based coating.

* * * * *